Nov. 11, 1969  J. T. DERVAN III  3,478,286
SYSTEM FOR AUTOMATICALLY TESTING COMPUTER MEMORIES
Filed July 1, 1965  7 Sheets-Sheet 1

INVENTOR
JAMES T. DERVAN III
BY
ATTORNEY

United States Patent Office 3,478,286
Patented Nov. 11, 1969

3,478,286
SYSTEM FOR AUTOMATICALLY TESTING
COMPUTER MEMORIES
James T. Dervan III, Pleasant Valley, N.Y., assignor to
International Business Machines Corporation, Armonk,
N.Y., a corporation of New York
Filed July 1, 1965, Ser. No. 468,782
Int. Cl. G06f 11/00; G01r 15/12
U.S. Cl. 235—153                               9 Claims

ABSTRACT OF THE DISCLOSURE

Core memories are tested by varying the X-Y drive line bias and the sense-inhibit line bias over the operating range of a memory and detecting errors as data is transferred to or from the memory. The bias conditions at which errors occur are plotted to form a "Schmoo" curve representing the operating biases for which the memory is reliable.

---

This invention relates to a system for testing computer memories or storage units and more specifically to a system for automatically determining the error limitations of such a memory as a function of the voltage bias supplied to the drive lines for such a memory.

Data errors may arise for a variety of reasons during the transfer of data to or from the computer memory or storage unit. For example, the storage unit may contain a "weak" magnetic core or memory element which would not switch when supplied with the appropriate drive currents. More often, however, errors arise because of the line drivers to the respective memory elements and in the sense lines and sense amplifiers when the respective voltage biases supplied to these lines are not properly adjusted. For example, if the voltage bias of the sense line is too large, noise arising during the write cycle might be sufficiently large to block the sense amplifier or at least prevent recovery thereof in time to receive a data signal during the read cycle. Furthermore, if the voltage bias supplied to the drive lines is too large there may result a saturation of the number of the memory elements or, if the drive line voltage bias is too small, the respective read and write signals may not have sufficient strength to switch the memory elements. Thus, the voltage biases supplied to various drive lines and sense inhibit line are important factors in memory design as well as in testing and determining memory quality. A particular criteria for both memory design and testing is the determination of the error limits of the memory as a function of the respective drive line and sense inhibit line voltage biases.

When the drive line and inhibit line voltage biases are incrementally varied in an increasing and decreasing manner until an error in the system occurs, a plot of such error points as a function of the drive sense bias voltages forms a closed curve which because of its general shape has come to be known in the computer terminology as a "Schmoo" curve and the area within such a curve represents those respective bias voltages for which the memory is of a reliable quality. Such curves are employed not only in the design of a particular type of memory but also in the testing of a memory after the manufacture thereof to insure reliable quality before the memory and its corresponding computer system is delivered to the customer.

In the past, such plots have been obtained while the observer making the tests manually varies the respective bias voltages until an error occurs at which time the observer notes the particular biases at which such error occurs and proceeds to make the plot. It will be appreciated that such manual plotting is time consuming not only insofar as the work time of the observer but also in regard to the machine time of the computer that is used to supply the diagnostic program to the memory during the tests. It will be further appreciated that when a memory is being tested in the field it is most desirable to have a system for quickly applying a diagnostic test in a minimum amount of time so as to allow the computer to be put back into service as quickly as possible.

It is an object of the present invention to provide an improved system for automatically obtaining characteristics of a computer memory during operation of the memory.

It is another object of the present invention to provide an improved system for the direct generation of information pertaining to failing voltage conditions of a computer memory during the memory operation.

It is still another object of the present invention to provide a system for obtaining diagnostic test results, which system may be employed in the laboratory, in a manufacturing area or in the field.

It will be understood that each word or segment of information to be stored in the memory is provided with a parity bit that will be either a 1 or a 0 depending upon the number of ones existing in the word and also on whether the parity code employed is odd or even. Each time a word is transferred from the memory, the parity is checked in an appropriate manner and a conflict between the parity bit and the parity of the word is noted by an appropriate error light or other type of alarm system. As contemplated in the present invention, the storage unit may be of any conventional type such as, for example, a memory where each memory element is selected by two drive lines (X and Y drive lines) each of which is supplied with a one-half select current, a sense-inhibit line (Z drive line) which senses a change of state of memory element during the read cycle and which is provided with a one-half drive current during the write cycle when it is desired to inhibit the writing of a one (1).

When the system of the present invention is employed, the computer utilizing the memory to be tested is programmed to supply data to the respective memory elements of the memory and then to read the data out while the X, Y and Z drive lines are under particular voltage biases. If no error in the data is detected, that is, if a parity check does not indicate that any particular bit has been picked up or lost, the resepctive drive biases are increased in a systematic manner and the sequence is repeated until an error does occur. The time required to complete each step of the routine may vary from a few microseconds up to a full second depending upon the access time and the time required for the read-write cycle as well as upon the size of the memory.

When an error is detected, one of the variable voltage biases is reset to its nominal value with the other variable voltage bias being increased by a given increment and the routine is repeated. Since the X and Y drive lines cooperate with one another during both the read and write cycles, the voltage biases for these drive lines are treated as one variable and the Z or inhibit sense line voltage bias is treated as a second variable such that the error limits of the memory can be plotted as a two dimensional function. With the system of the present invention, such a two dimensional plot is obtained automatically with the plotter being actuated each time an error is detected.

Specifically, the system of the present invention includes a pair of potentiometers that may be driven continuously or in a stepping fashion by a digital stepping motor to vary the Z and X-Y bias voltages which voltages are supplied to the respective memory drive lines and to an analog to digital converter for conversion to digital signals that are in turn compared in a subtractor circuit to a preset reference signal. The output of the subtractor circuit will be of such polarity as to drive the respective stepping motor in a direction to equalize the bias voltage and the reference voltage level. The respective Z and X–Y motors and potentiometers are operated independently and at different times upon the occurrence of appropriate gating signals. The above-referred-to reference level for the Z bias is incremented after each to X–Y bias test. At each incremental setting of the Z bias, the X–Y bias is varied in one direction until an error in the transmission of data to and from the memory is encountered and an error detection signal is employed to actuate a plotter to plot the point at which the error occurred. The error signal also resets the memory and the X–Y bias is varied in a direction opposite to that previously described until a second error is encountered. Again the plotter is actuated to plot the point of the second error by an error signal that also again resets the memory, returns the X–Y bias to its nominal value and increments the Z bias whereupon the same sequence of operations is repeated. When the Z bias has been increased to the point where an error occurs without variation of the X–Y bias from its nominal value, this point is plotted and both the Z bias and the X–Y bias are returned to their nominal values whereupon the entire sequence of operations is repeated, the Z bias being varied in the direction opposite to that described above.

Other objects, advantages and features of the present invention will become more readily apparent from a review of the following specification when taken in conjunction with the drawings wherein.

Before a detailed description of the features of the present invention is given, the objects of the present invention will be more specifically described to provide a better understanding of the invention.

Figures 3A, 3B:
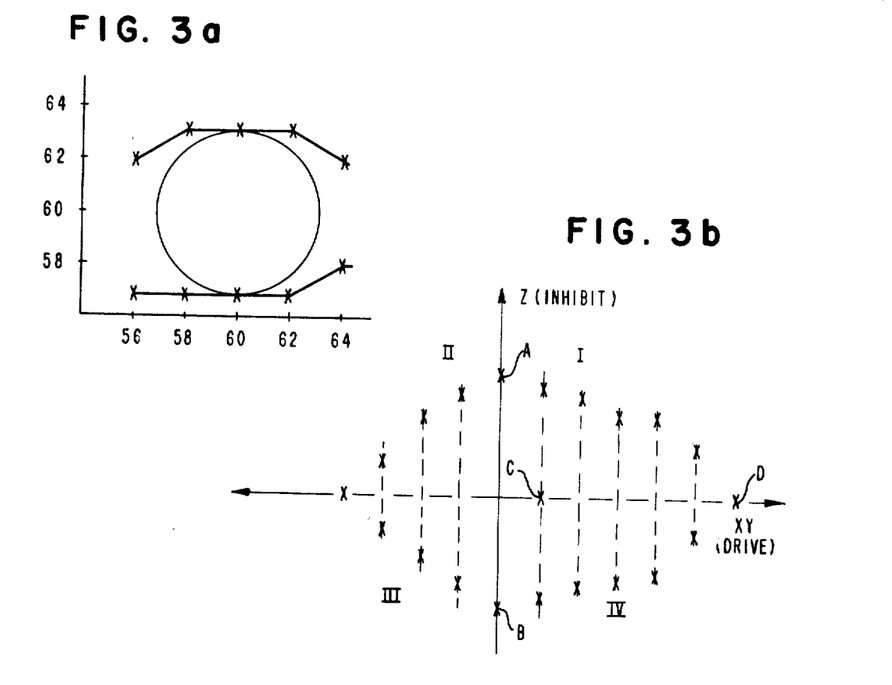
FIGURE 3 is a graph of the type generated by the present invention and illustrates the sequence of steps employed by the system of the present invention.

FIGURES 3a–d represent a series of plots of memory error limits as a function of the X–Y drive bias and the Z sense inhibit bias. It is to be understood that each pair of coordinate points represent a condition of a specific time duration during which data was supplied to each of the memory elements in the memory and read out therefrom. FIGURE 3a represents a typical plot of such error limits as might be expected from a test from a standard memory in a computer when tested either in the field or prior to delivery to a customer. The nominal bias voltage for both the X–Y drive lines and the Z sense inhibit line is 60 volts and the two solid curves represent the boundary within which the memory may be expected to reliably operate, these boundary curves representing points at which memory error occurs. The circle within the two boundary curves represents the area in which the memory is designed to operate and a test of the memory unit resulting in the curves of FIGURE 3a indicates that the memory is of an acceptable quality. While the two boundary curves would normally be expected to form a closed loop, the two boundary curves in FIGURE 3a are open merely because the memory test was not carried out over a sufficiently wide variation of the Z bias, such variation not being required in a standard field test.

Figure 3C:
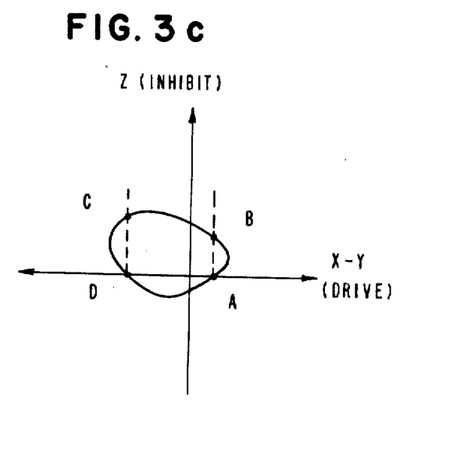
Figure 3D:
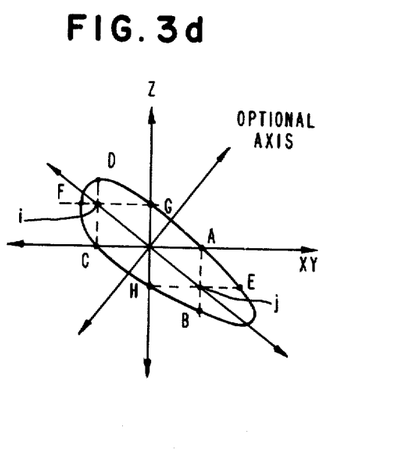
Figure 4:
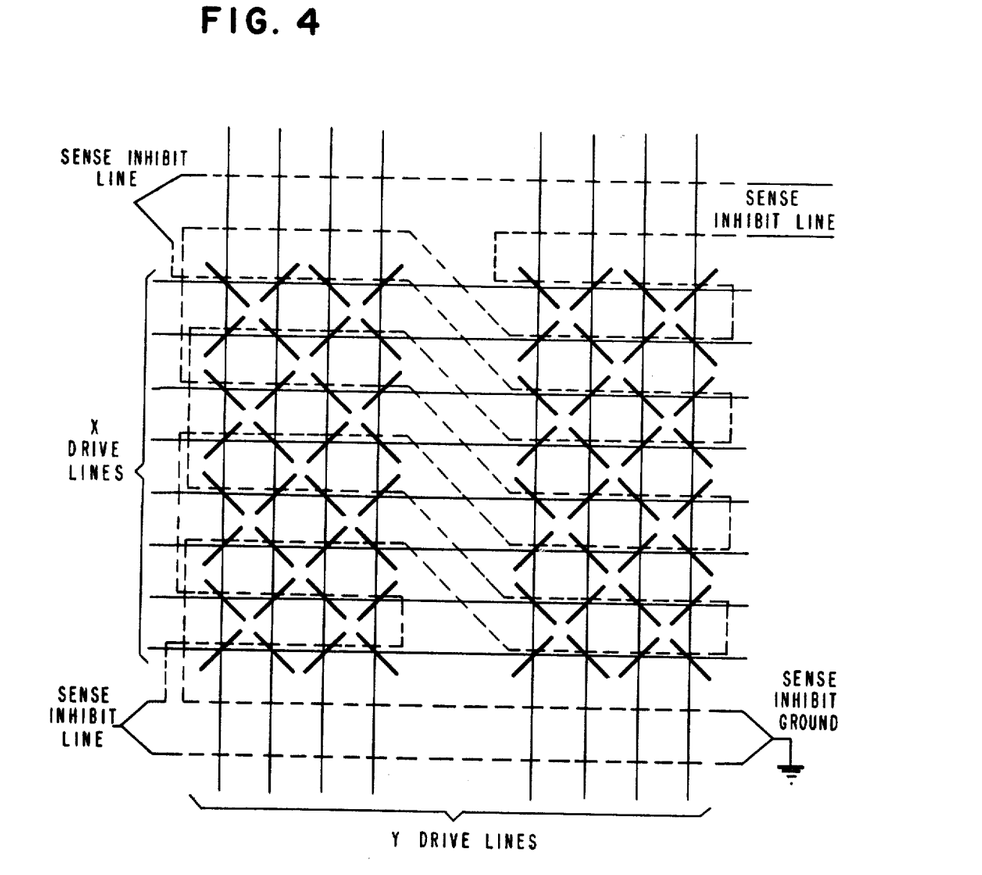
FIGURE 4 is a schematic diagram of a typical memory unit including appropriate drive lines and sense inhibit line.

When a newly designed memory unit is being tested, the resultant plot will be in the form of closed loop such as is indicated in FIGURES 3b, 3c and 3d. The closed loop of FIGURE 3b represents the type of error limit curve that would be desired from the test of a newly designed memory and this curve will be described more in detail in regard to the operation of the system of the present invention. While the curves of FIGURES 3c and 3d are non-ideal, memory units possessing such curves may still be adequate if a circle having a radius of a required voltage can be drawn within the curve. While the particular significance of such non-ideal curves is of importance to the designer of the memory unit, the particular shape of such curves is not of significant importance to the system of the present invention except insofar as the requirement that the system of the present invention be able to plot such curves.

To illustrate the manner in which the end results of the present invention are obtained, that is to say the manner in which the plot of the error limits of the memory are made, specific reference is made to FIGURE 3b. At the beginning of the test, the respective coordinates are positioned so as to represent the nominal biases applied to the X–Y drive lines and the Z sense inhibit line where the phrase "nominal bias" is intended to mean that bias at which the memory is designed to operate. With the respective potentiometers adjusted to maintain the respective biases at such nominal values, the Z potentiometer is actuated to incrementally increase with data being supplied to and read out of the memory at each incremental increase until an error occurs such as illustrated at point A in FIGURE 3b. At this time the plotter is actuated to plot this point and the Z bias potentiometer is reset to nominal value and then incremented in a decreasing direction until an error occurs such as indicated at point B in FIGURE 3b. After this point is plotted, the Z potentiometer bias is returned to nominal value and the X–Y bias potentiometer is activated to increase a given increment such as indicated at point C at which time the routine for the Z bias potentiometer activation is repeated. This process is continued until an error is detected after an incremental increase in the X–Y bias such as is indicated at point D which point is plotted and both the X–Y bias and the Z bias are returned to nominal values and the entire routine is repeated with the exception that the X–Y bias potentiometer is actuated in decreasing increments.

As will be pointed out below, variations of the above described routine can be employed. For example, where the approximate location of the error limit curve is known, the Z bias potentiometer may be actuated continuously rather than in an increment step fashion until the error limit curve is approached and then actuated in stepped increments until an error is detected. In another mode of operation, the system may be adapted to actuate the Z bias in a continuous manner until an error is detected at which time the system slightly decreases the Z axis bias and then increases in stepped increments until an error is detected. The manner in which the above routine and variations thereof as well as the resultant plot of the error limit curve is obtained will be more fully described below with reference to the system of the present invention and the various subsystems thereof and their components.

Figure 1:
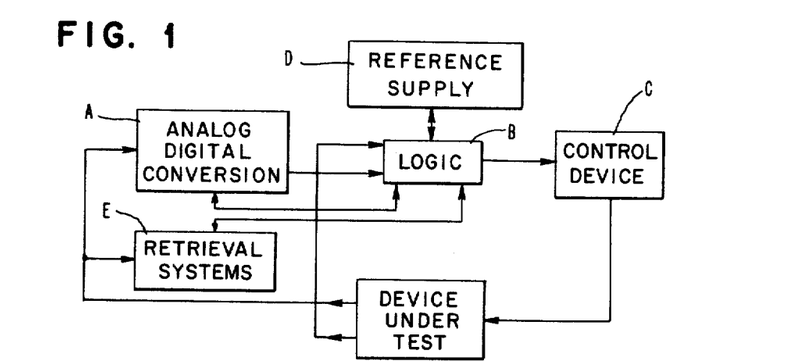
FIGURE 1 is a schematic diagram of the system of the present invention when connected to a typical memory unit to be tested.
Figure 2A:
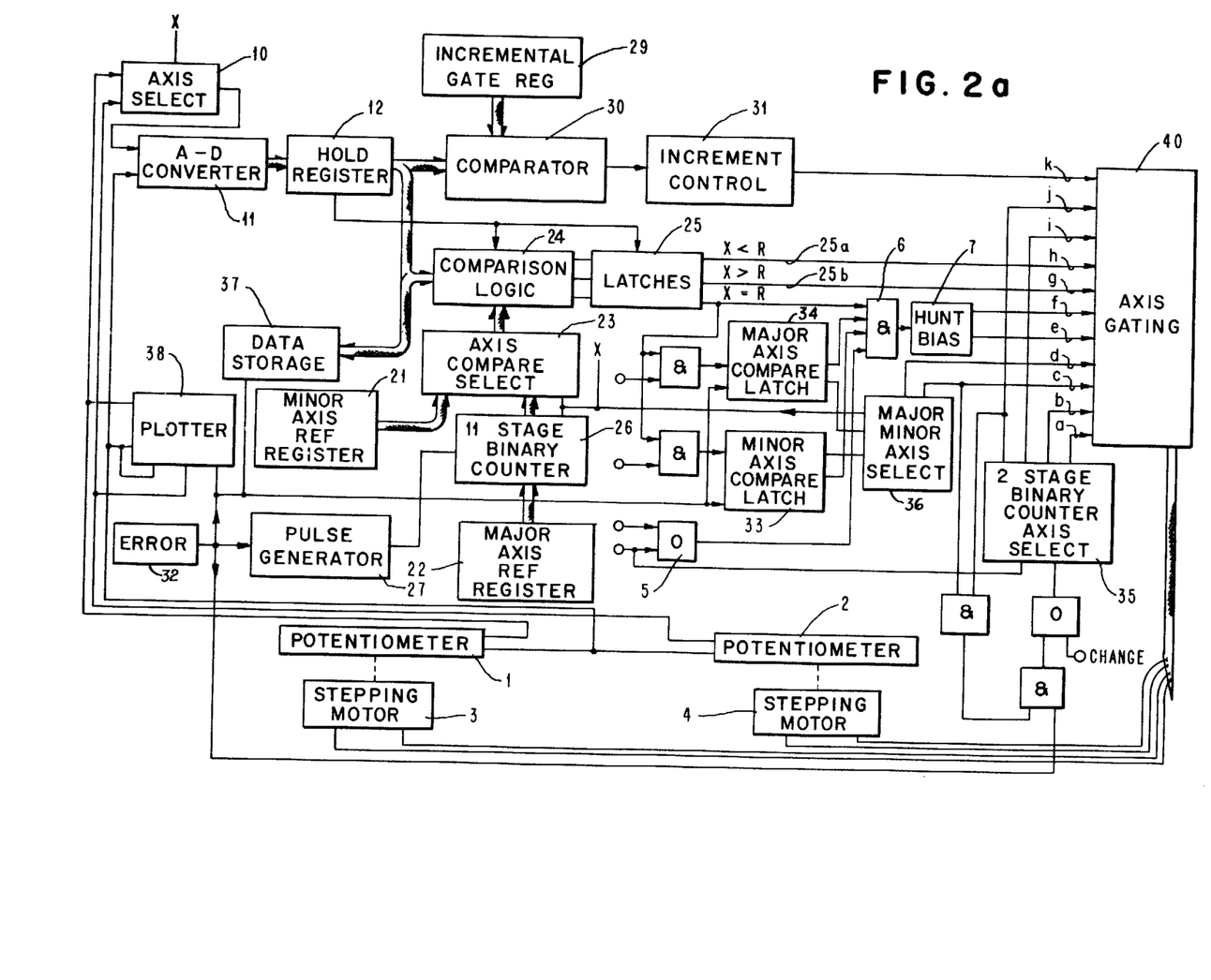
FIGURE 2a is a detailed schematic diagram of the system of the present invention.
Figure 2B:
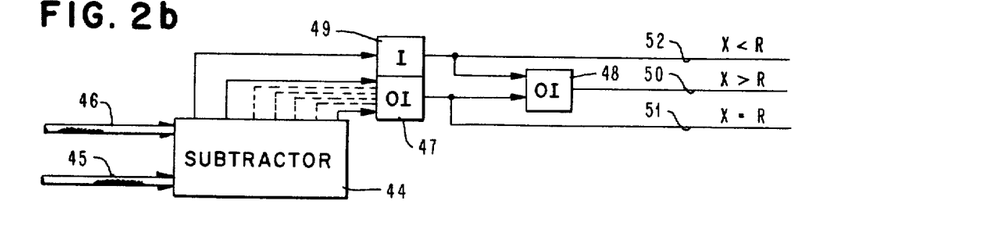
FIGURE 2b is a detailed schematic diagram of the comparison logic of the present invention.

The system of the present invention is illustrated schematically in block form in FIGURE 1 wherein the major subsystems are indicated, namely analog-to-digital converter A, the comparison logic B, the servo control C, storage means D to monitor and supply the required reference values, and retrieval system E to either store or plot data. FIGURE 2a is a detailed schematic of the present invention and FIGURE 2b illustrates the comparison logic.

Figure 5:
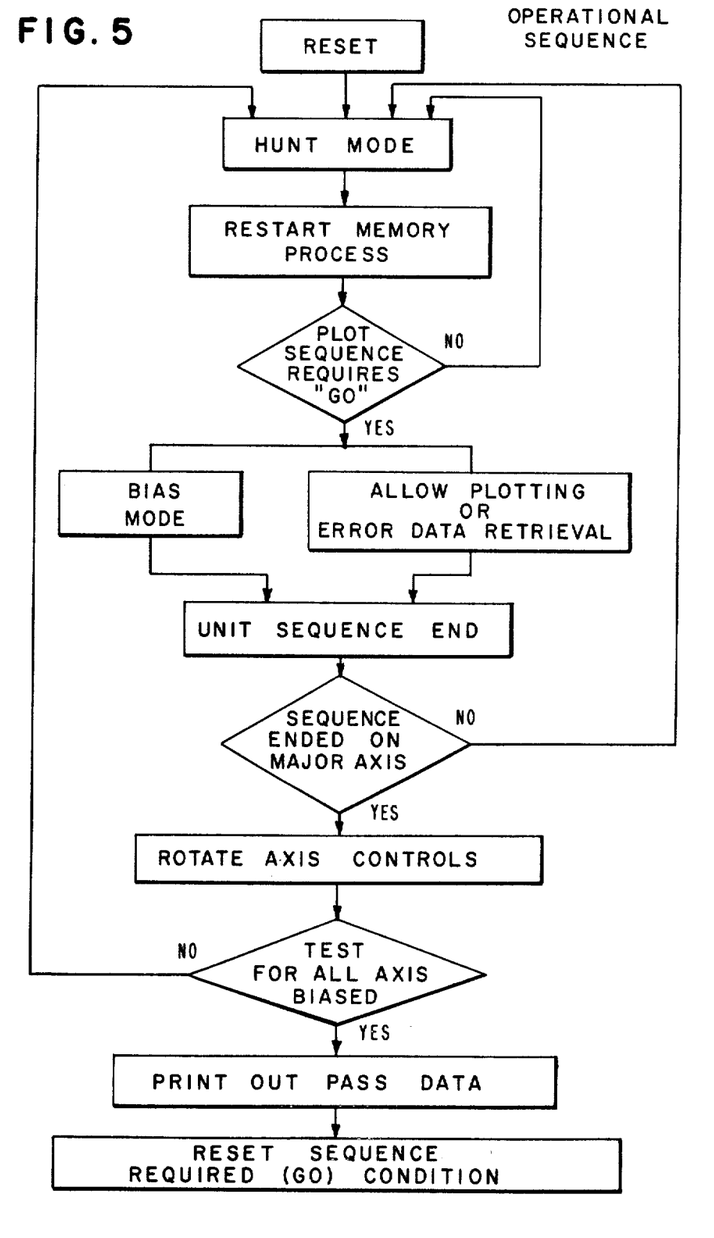
FIGURE 5 is a diagram illustrating the operational sequence of the present invention.
Figure 6:
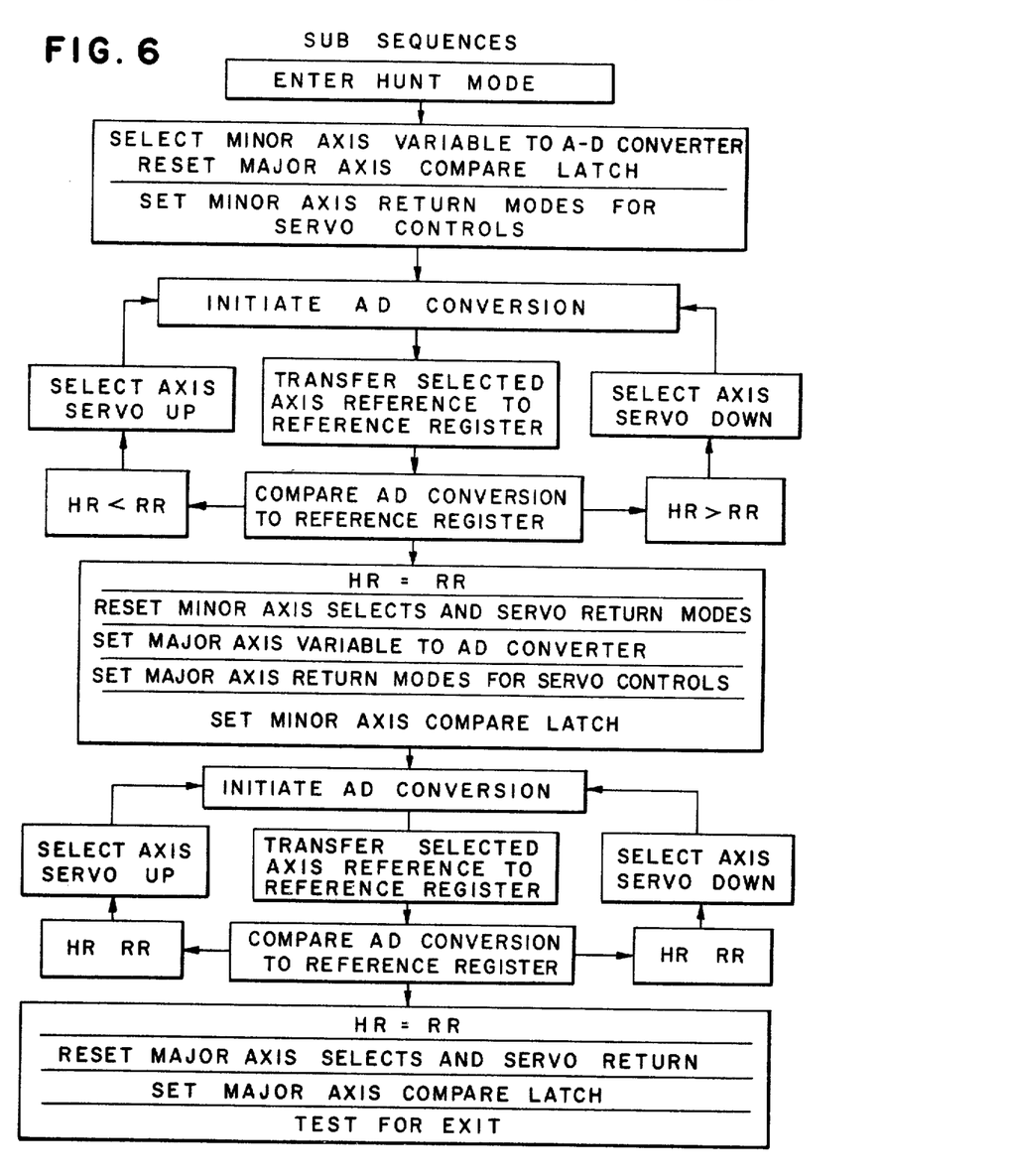
FIGURE 6 is a diagram illustrating the Hunt mode sequence of the present invention.
Figure 7:
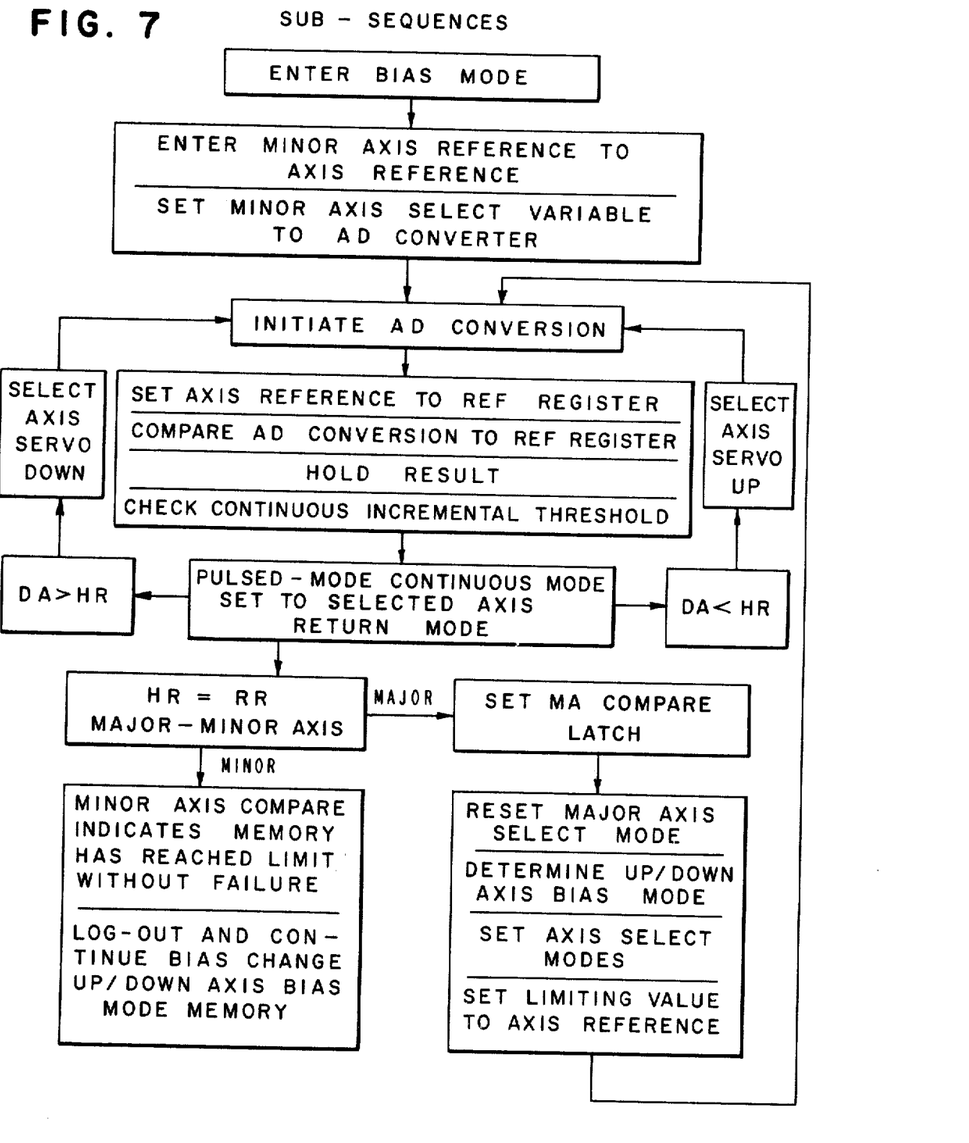
FIGURE 7 is a diagram illustrating the Bias mode sequence of the present invention.

The sequence of operations of the present system is illustrated in FIGURES 5, 6 and 7 where FIGURE 5 illustrates the entire operational sequence while FIGURE 6 illustrates the subsequence for the Hunt mode and FIGURE 7 illustrates the subsequence for the Bias mode. As indicated in the above brief description of the operation, the Hunt mode is employed to position the respective read-write drivers and the sense-inhibit driver voltages at preselected reference values which initially are the nominal values at which the memory would operate. Once this initial operating point is achieved, a bias mode of operation is employed to increase one of the drive bias values until failure is achieved or the memory has been tested over an appropriate range without failure. Upon the occurrence of either of these two events the Hunt mode is again employed to locate a new reference point.

Upon initiation of the operational sequence, the various registers and counters are reset and the system enters the Hunt mode. Axis select gate 10 in FIGURE 2a is set to connect the minor axis memory voltage controlled by potentiometer 1 to analog-to-digital converter 11 and the resultant digital signals are stored in hold register 12. Initial nominal values of both major and minor axis operating points have been manually placed in registers 21 and 22 respectively and during the first portion of the Hunt mode subsequence as illustrated in FIGURE 6, the minor axis nominal value in register 21 is transferred by comparison selecte gate 23 to comparison logic 24. Comparison logic 24 is illustrated in FIGURE 2a. This comparison sets one of three latches in comparison generator 25. If the data stored in Hold register 12 is dissimilar from the minor axis nominal input, an appropriate signal is raised on either line 25a or line 25b which sets axis gating circuit 40 to appropriately change the bias value of minor axis potentiometer 1 by activation of minor axis stepping motor 3. As indicated in the subsequence of FIGURE 6, the process is repeated until coincidence is obtained between the converted minor axis value in hold register 12 and the nominal minor axis value transferred from input register 21. Minor axis compare latch 33 is set thereby activating major minor axis select gate 36 to select major axis gate line d of FIGURE 2a and the same procedure is then repeated with axis select gate 10 having selected major axis potentiometer 2 and axis gating circuitry 40 being set to activate major axis stepping motor 4. When major axis compare latch 34 is set, gate 36 selects minor axis line c for entry into the Bias mode or re-entry into the Hunt mode.

The program of data supply to the memory under test is now initiated and the system determines whether or not it has been instructed to initiate the bias value increases to test the memory for failure. If not, the system then re-enters the Hunt mode and the above routine is again repeated. As indicated in FIGURE 5, the system will continue to repeat this process until instructed to proceed with the test such as by a proceed signal initiated from the control panel of the sytem and supplied to OR gate 5, AND gate 6 and Hunt Bias gate 7. When the system has been instructed to proceed with the tests, it then enters the bias mode which is illustrated by the diagram in FIGURE 7.

The bias mode subsequence is similar in part to portions of the Hunt mode subsequence to the extent that a comparison is made to the reference valve with the minor axis bias potential being adjusted either continuously or incrementally until it equals the reference value. It is normally during the minor axis potential bias sweep that a fail condition would be expected to be encountered. However, it may be desirable to merely scan a given region of the minor axis potential bias sweep to see if an error does occur and if one does not occur this fact will be noted and the operational sequence continued.

Upon entry of the system into the bias mode, the minor axis hunting bias reference value is transferred from reference supply storage D of FIGURE 1 to register 21 of FIGURE 2a. Axis select gate 10 is set to connect the minor axis memory voltage controlled by potentiometer 1 to analog-to-digital converter 11 and the analog-to-digital conversion is initiated and the converted value is transferred to hold register 12. If comparison with the reference value in comparison circuit 24 does not indicate coincidence, an appropriate signal from comparison generator 25 sets axis gating circuit 40 to activate servo motor 3 and the process is continued either until comparison indicates coincidence or until an error is detected by error circuit 32 which may be just a photo cell placed opposite the error light of the memory under test.

Since the sequence does not end upon the major axis, the system again enters the Hunt mode upon a signal being initiated from minor axis compare latch 33 upon detection of the existing conditions of the sequence. During the Hunt mode, the respective potentiometers 1 and 2 are set to the original nominal values as has already been explained and the system then again enters the bias mode with the exception that the minor axis reference value to be compared in comparison circuit 24 is less than the minor axis nominal value by an amount the same as the earlier minor axis reference value was greater, although this is not a necessary condition. At the end of this second bias mode, binary counter 2 is activated to increment the major axis reference value such that when the system again enters the Hunt mode a new major axis reference value is present. In this manner the system obtains data for plotting the two quadrants on one side of the original nominal values which plots end with an error detection on the major axis. Upon determination of this condition, a two stage binary counter is incremented to in turn increment the major axis potential bias in the direction opposite from which it was previously incremented and the system again enters the Hunt mode at which time both axis potential biases are returned to their original nominal values and the unit sequences are again repeated until data has been collected for plotting the remaining portion of the graph.

Counter 35 is of such nature as to require incrementation four times to return to its original value at which time the entire operational sequence is ended as illustrated in FIGURE 5 and the data representing each error as stored in data storage 37 is printed out, all the registers and counters are reset and the entire operational sequence is ended.

For routine test plots, the entire operational sequence could be terminated at this point. However, in order to obtain plots of skewed curves such as were discussed in relation to FIGURE 3, provision is made for "rotating" the axis by 90 degrees and again running the entire plot. This is done by merely selecting the former minor axis as the new major axis and vice versa. After both complete scans or plots have been made, the system may be adapted to print out the acquired data if such is not already placed on the graphical plots and the entire system is reset with initial conditions.

Figure 8:
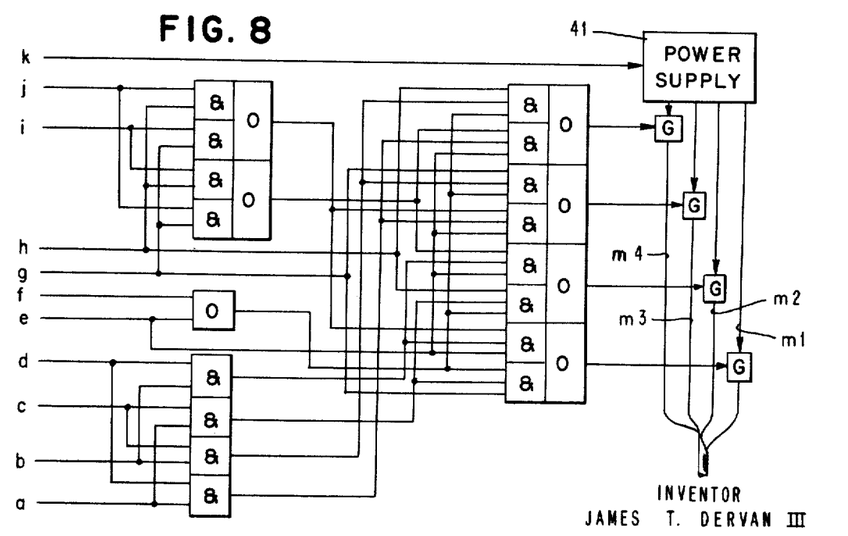
FIGURE 8 is a schematic diagram of the axis gating circuit.

Axis gating circuit 40 is illustrated in detail in FIGURE 8 and illustrates the manner in which the gating circuit controls the selection of the respective drive lines that supply electrical power to stepping motors 3 and 4 where drive line $M_1$ provides electrical signals to drive stepping motor 3 in a manner to decrease the value of potentiometer 1, drive line $M_2$ supplies electrical signals to activate stepping motor 3 in such a manner to increase the value of potentiometer 1, drive line $M_3$ supplies electrical signals to drive stepping motor 4 in a manner to decrease the value of potentiometer 2 and drive line $M_4$ drives stepping motor 4 in a manner to increase the value of potentiometer 2. Power source 41 may be of a conventional type to supply pulses of an appropriate frequency required to drive the respective stepping motors in a continuous fashion or only at selected time periods upon receipt of specific pulses along conductor $k$ from increment control 31 of FIGURE 2. Increment control 31 is employed when it is desired to drive one or the other of stepping motors 3 or 4 in a continuous fashion until the value of respective potentiometers 1 and 2 is equal to a preset error limit value supplied to increment gate register 29, the comparison being made on the fly by comparison circuit 24.

The particular gating circuit of axis gating circuit 40 will not be specifically described except to say that it is a typical way of mechanizing the following logical expressions:

$$M_1 = (e+f) \; acg + edb \; (ig+jh)$$
$$M_2 = (e+f) \; ach + edb \; (ih+jg)$$
$$M_3 = ead \; (ig+jh) + (e+f) \; bcg$$
$$M_4 = ead \; (ih+jg) + (e+f) \; bch$$

where for a true or high value of each of the variables, $a$ represents the selection of the X-Y drive coordinate as the major axis, $b$ represents the selection of the Z drive coordinate as the major axis, $c$ indicates that the minor axis is to be varied, $d$ indicates that the major axis is to be varied, $e$ indicates that the system is in the Hunt mode, $f$ indicates that the system is in the Bias mode, $g$ indicates that the selected stepping motor is to be activated to decrease its corresponding potentiometer, $h$ indicates that the selected stepping motor is to be activated to increase its corresponding potentiometer, $i$ indicates that the system is testing positive values of the selected major axis, and $j$ indicates that the system is testing negative values of the selected major axis.

The particular logical equations will not be described in detail except to say that they satisfy the requirements of the above described operational sequence and the Hunt and Bias modes. The other respective gates, latches, registers are of a type well known in the art. A particular comparator that may be employed is illustrated in FIGURE 2b. This comparator is a subtractor circuit 44 which is in the form of an adder adapted to provide the subtraction operation in parallel upon a plurality of input signals in a manner well known in the art. For example, twelve input signals representing the potentiometer valve converted into digital form may be supplied from hold register 12 of FIGURE 2a to subtractor 44 by conductor bus 46 to be compared with another twelve input signals received from either of reference registers 21 or 22 via comparator select circuit 23 and conductor bus 45. In subtractor circuit 44, the signals received from conductor bus 45 are inverted or complemented and the respective bits represented by these signals are added to the bits represented by the signals on conductor bus 46. To complete the subtraction of the reference bits from the input bits from hold register 12, a unit bit is added to the above referred to sum when the subtrahend or reference value is complemented by employing the "1's complement method" and when this method is employed, an end carry will result from the most significant digit adder stage when the minuend is greater than or equal to the subtrahend or when the value to be compared is greater than or equal to the reference value. This carry signal is then inverted by inverter 49 with the output appearing on conductor 52 representing the condition when the value to be compared is less than the reference value. To test for equality or coincidence between the reference value and the value to be compared, the respective output lines from subtractor 44 are supplied to OR invert circuit 47 such that if a 1-bit exists in the output register of subtractor 44, a low signal would be placed on conductor 51 and, conversely, if all the bits in the output register of subtractor 44 are 0, a high signal would be placed on conductor 51 indicating coincidence between the reference value and the value to be compared. Since the respective conditions of the value to be compared being greater than less than, or equal to the reference value are mutually exclusive, the conditions of the value to be compared being greater than the reference value can be generated by supplying the signal on conductor 51 and the signal on conductor 52 to OR Invert circuit 48 such that a high signal will appear on conductor 50 only when a similar high signal does not appear on either conductor 52 or 51.

The system thus described can be employed to plot any type of curve. For example, when a curve of the type illustrated in FIGURE 3c is encountered, the system will plot curve A-D and curve B-C when the horizontal axis is selected as the major axis and will plot curve A-B and curve D-C when the vertical axis is selected as the major axis. It will be appreciated that the system cannot plot the entire curve when the horizonal axis is the major axis since the respective sequences are adapted to end whenever an error is detected on the major axis. When a curve of the type illustrated in FIGURE 3d is encountered, the system would first plot curve A-D and curve C-B and then curve G-E and curve F-H, portions of the respective curves overlapping. This type of curve is not the normal curve that would be encountered in a production or field test but would only arise when a new memory is being designed. Under these particular circumstances, the system can be reset with new nominal values first of those corresponding to point $i$ and then those corresponding to point $j$ to complete the curve.

An optional manner by which the curve of FIGURE 3d may be plotted is one by which the signals from gating circuit 40 of FIGURE 2a are simultaneously shared by stepping motors 3 and 4 as by a voltage divider or a circuit to concurrently provide different pulse trains to the respective motors. In such a manner the effective axes may be rotated by any given amount as indicated by the optional axis of FIGURE 3d and the operational system is then performed in the same way as described above. It will be appreciated that the system of the present invention can be adapted to plot any curve whether it is represented by an algebraic or a transcendental function.

Not only does the system of the present invention provide major time saving for the testing of a computer memory, but it also provides much greater resolution or accuracy in determining the error limits of such a memory. It will be appreciated that during the test sequence, data is supplied to and from the memory at time intervals governed by the memory time cycle and, with the present invention, error determination can be made at the time of error detection rather than many cycles later as is the case with manual testing.

While the present invention has been particularly shown and described with reference to a preferred embodiment thereof, it will be understood by those skilled in the art that changes in form and details may be made without departing from the spirit and scope of the invention as claimed.

What is claimed is:

1. A system for determining error limits for a computer memory as a function of the drive line and sense-inhibit line voltage biases applied thereto, said system comprising:
   means to sequentially vary the respective voltage biases from nominal voltage levels;
   means to test for an error occurrence upon transfer of data to or from said memory; and
   means to store information relating to the error occurrence as a function of the voltage bias variations at the time of said error occurrence.

2. A system for determining error limits of a computer memory as a function of the drive line and sense-inhibit line voltage biases applied thereto, said system comprising:
  means to select a first and a second nominal voltage level for the respective voltage biases;
  means to vary one of said voltage biases from said first nominal voltage level to provide a plurality of test levels;
  means to vary the other of said voltage biases from said second nominal voltage level, while said one bias is at one of said test levels, to provide a series of test points covering the operating range of said memory;
  means to detect error occurrence at each of said test points as data is supplied to or from said memory,
  an means responsive to said detection means to store information relating to each error occurrence as a function of the voltage biases of said test point at which such error occurs.

3. A system according to claim 2 wherein the information storage means is adapted to plot said error information with the sense-inhibit voltage bias being employed as one coordinate and the drive line biases being employed as the other coordinate.

4. A system according to claim 3 including means responsive to a condition of error occurrence without further voltage bias variation to reset the respective voltage biases to the original nominal voltage levels and make a new selection of coordinates.

5. A system according to claim 4 wherein said responsive means is adapted to select, as said new coordinates, said one voltage bias to be varied from said first nominal voltage level and said other voltage bias to be varied in a manner opposite to the variation thereof prior to the condition to which said means respond.

6. A system for testing for error occurrence of computer memory as a function of the drive line and sense-inhibit line voltage biases applied thereto, said system comprising:
  a pair of potentiometers coupled to the respective memory voltage biases to vary the respective voltage levels thereof;
  an analog-to-digital converter connected to said memory voltage biases to sequentially convert first one and then the other of the respective memory voltage biases into digital signals;
  drive means to vary said potentiometers;
  means to establish reference signals;
  a comparison circuit coupled to said converter and to said means, said circuit being operative to compare said converted digital signals to said reference signals and produce an output indicative thereof; and control means connected to said drive means and said output for operating said drive means in response to said output so as to vary said voltage potentiometers when the converted digital signals differ from said reference signals.

7. A system according to claim 6, said last-mentioned means including a gating circuit coupled between said comparison circuit and said drive means to activate said drive means in response to whether said converted digital signals are greater than, or less than said reference signals.

8. A system according to claim 7 wherein said drive means includes a pair of stepping motors, one to drive each of said potentiometers;
  means establishing a second reference signal; and
  said system further including a second comparison means connected to said last-mentioned means and to said converter for comparing said second reference signal with the output of said converter and producing an output indicative thereof whereby a particular voltage bias is varied continuously until it reaches a predetermined value after which said bias is increased in incremental steps.

9. A system for testing for error occurrence in a computer memory as a function of the drive line and sense-inhibit line voltage biases applied thereto, said system comprising:
  means to select a first and a second nominal voltage level for the respective voltage biases, said means including a pair of potentiometers coupled to the respective memory voltage biases to vary the respective voltage levels thereof;
  an analog-to-digital converter connected to said memory voltage biases to sequentially convert first one and then the other of the respective memory voltage biases into digital signals;
  means to detect error occurrence as data is supplied to or from said memory,
  drive means to vary said potentiometers;
  means to establish reference signals;
  a comparison circuit coupled to said converter and operative to compare said converted digital signals to said reference signal and produce an output indicative thereof; and
  means responsive to said output for operating said drive means to vary said voltage potentiometers when the converted digital signals differ from said reference signals.

References Cited

UNITED STATES PATENTS

| | | | |
|---|---|---|---|
| 3,271,674 | 9/1966 | Horning et al. | 324—73 |
| 2,920,818 | 1/1960 | Taylor et al. | 340—146.1 X |
| 2,996,666 | 8/1961 | Baker | 324—73 |
| 3,027,542 | 3/1962 | Silva | 340—146.1 X |
| 3,252,097 | 5/1966 | Homan | 340—146.1 X |

FOREIGN PATENTS

| | | |
|---|---|---|
| 1,000,281 | 8/1965 | Great Britain. |

OTHER REFERENCES

John Rogers and John King, "The Case for Magnetic Logic," Electronics, June 1, 1964, pp. 40–47.

MALCOLM A. MORRISON, Primary Examiner

CHARLES E. ATKINSON, Assistant Examiner

U.S. Cl. X.R.

324—73; 340—172.5, 174